(12) United States Patent
Vourc'h et al.

(10) Patent No.: US 8,625,696 B2
(45) Date of Patent: Jan. 7, 2014

(54) HYBRIDIZATION DEVICE WITH SEGREGATED KALMAN FILTERS

(75) Inventors: Sébastien Vourc'h, Paris (FR); Victor Mauger, Paris (FR)

(73) Assignee: Sagem Defense Securite, Paris (FR)

(*) Notice: Subject to any disclaimer, the term of this patent is extended or adjusted under 35 U.S.C. 154(b) by 24 days.

(21) Appl. No.: 13/139,720

(22) PCT Filed: Dec. 16, 2009

(86) PCT No.: PCT/EP2009/067333
§ 371 (c)(1),
(2), (4) Date: Jun. 14, 2011

(87) PCT Pub. No.: WO2010/070011
PCT Pub. Date: Jun. 24, 2010

(65) Prior Publication Data
US 2011/0243194 A1    Oct. 6, 2011

(30) Foreign Application Priority Data
Dec. 17, 2008  (FR) .................................... 08 58726

(51) Int. Cl.
*H04B 7/02*    (2006.01)
*G06F 19/00*   (2011.01)
*G06F 7/70*    (2006.01)

(52) U.S. Cl.
USPC ................................. 375/267; 701/16; 701/50

(58) Field of Classification Search
USPC ........................................ 375/267; 701/16, 50
See application file for complete search history.

(56) References Cited

U.S. PATENT DOCUMENTS

| | | | |
|---|---|---|---|
| 5,991,691 A * | 11/1999 | Johnson | 701/470 |
| 7,609,204 B2 * | 10/2009 | May et al. | 342/357.27 |
| 2005/0182530 A1 * | 8/2005 | Murphy | 701/16 |
| 2006/0041361 A1 * | 2/2006 | Matrosov | 701/50 |
| 2006/0146136 A1 * | 7/2006 | Cho | 348/207.1 |
| 2007/0265810 A1 * | 11/2007 | Martin et al. | 702/190 |
| 2008/0082266 A1 * | 4/2008 | Bye et al. | 701/214 |
| 2008/0114546 A1 * | 5/2008 | Kamel et al. | 701/226 |
| 2008/0272961 A1 * | 11/2008 | Wirola et al. | 342/357.12 |
| 2009/0132164 A1 * | 5/2009 | Goodall et al. | 701/213 |

FOREIGN PATENT DOCUMENTS

| | | |
|---|---|---|
| EP | 1 801 539 A1 | 6/2007 |
| FR | 2 866 423 | 8/2005 |
| WO | WO 2008/040658 A1 | 4/2008 |

* cited by examiner

*Primary Examiner* — Leon-Viet Nguyen
*Assistant Examiner* — Sarah Hassan
(74) *Attorney, Agent, or Firm* — Blakely Sokoloff Taylor & Zafman

(57) ABSTRACT

The invention relates according to a first aspect to a hybridization device (1) comprising a virtual platform (2) calculating inertial measurements (PPVI), a bank (3) of Kalman filters each formulating a hybrid navigation solution on the basis of the inertial measurements of the virtual platform (2) and of measurements of signals emitted by a constellation of satellites, which measurements are delivered by a satellite positioning system (GNSS), characterized in that it comprises, for each filter of the bank, a module for correcting the satellite measurements (4) delivering to the filter the measurements of the satellite positioning system (GNSS) which are used by the filter after correction with the aid of the hybrid navigation solution formulated by the filter.

12 Claims, 1 Drawing Sheet

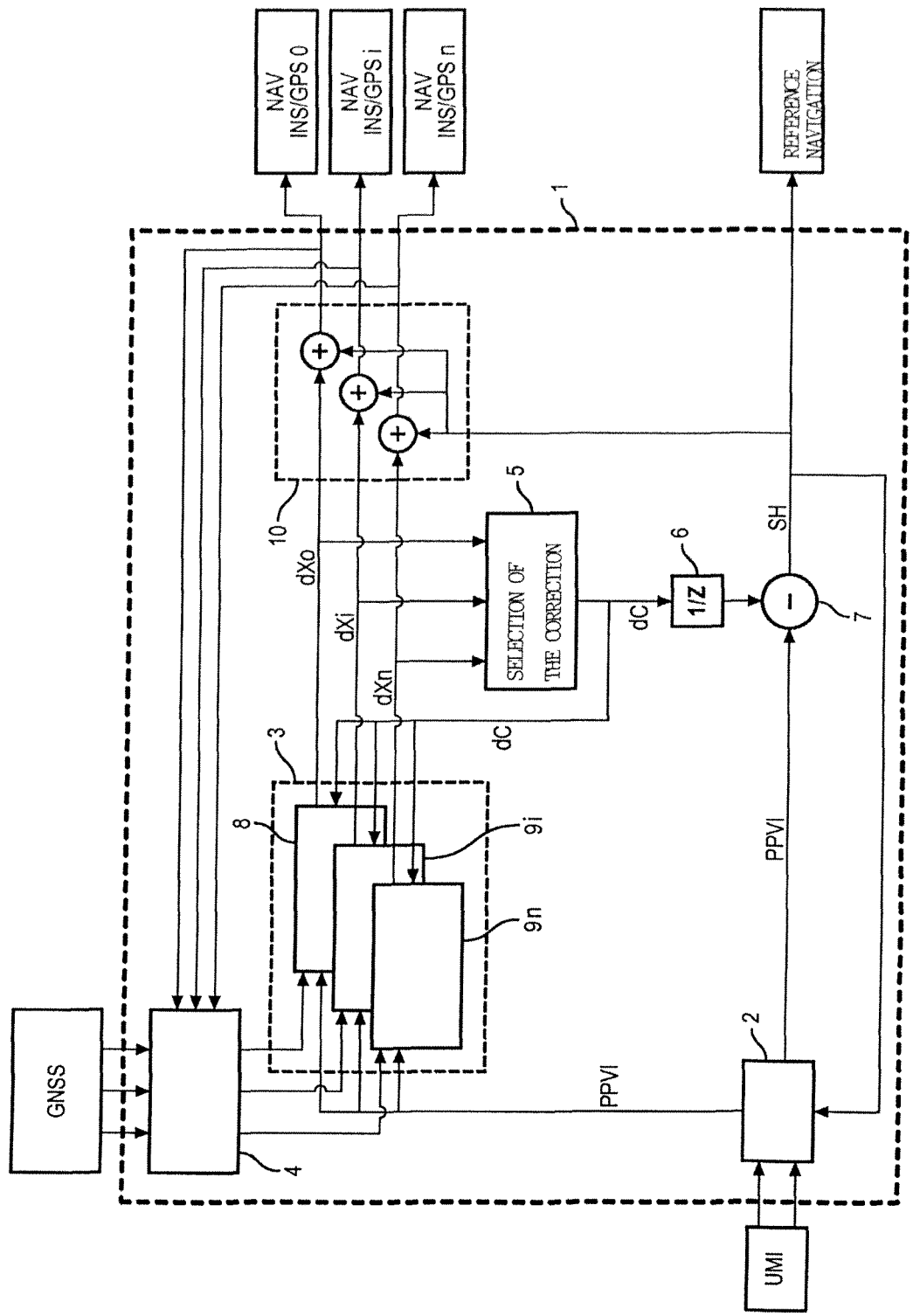

HYBRIDIZATION DEVICE WITH SEGREGATED KALMAN FILTERS

This is a non-provisional application claiming the benefit of International Application Number PCT/EP2009/067333 filed Dec. 16, 2009.

The field of the invention is that of carriers using information supplied both by an inertial unit and by a satellite navigation system, such as for example a GPS system.

The invention relates to a closed-loop hybridization device, and concerns more particularly the realisation of the hybridization with a protection in the sense of the integrity of the output data.

Carriers such as aircraft or instead ships have numerous navigation systems. Among these systems may be included in particular INS/GNSS (which stands for "Inertial Navigation System" and "Global Navigation System") hybrid equipment.

An inertial unit supplies low noise and precise information in the short term. However, in the long term, the localisation performance of an inertial unit deteriorates (more or less quickly as a function of the quality of the sensors, accelerometers or gyroscopes for example, and the processing used by the unit). Although the information acquired from a satellite navigation system is for its part very unlikely to drift in the long term, it is however often noisy and of variable precision. Moreover, the inertial measurements are always available whereas the GPS information is not or is likely to be falsified and scrambled.

Hybridization consists in combining the information supplied by the inertial unit with the measurements supplied by the satellite navigation system so as to obtain hybrid position and speed information by taking advantage of the two systems. Thus, the precision of the measurements supplied by the GNSS receiver makes it possible to control the inertial drift and the low noise inertial measurements make it possible to filter the noise on the measurements of the GNSS receiver.

Modern navigations systems calculate protection rays around the calculated position, which makes it possible to contain the real position error to a given integrity risk, which is what defines the integrity of a system.

According to the prior art, these protection rays may be calculated by means of a bank of Kalman filters which makes it possible to protect against the onset of a simple fault.

These filters realise the hybridization between the information from the satellite navigation system and that from the inertial unit. One of the filters of the bank of filters, designated by the term main filter, uses all the GNSS measurements constituted of pseudo-measurements and information on the quality thereof. The other filters, known as secondary, of the bank of filters only make use of part of the available GNSS measurements. If a fault arises at the level of a satellite measurement, it will not be seen by the filter not receiving this measurement: said filter will thus remain non polluted.

In the prior art, the integrity is based on the fact that in the event of a satellite fault, one of the filters of the bank is not affected by the fault.

According to a first architecture described for example as prior art in the document EP1801539 A (cf. FIG. 1 and corresponding discussion), N filters in closed loop are used on N virtual platforms. This architecture has the advantages of not being sensitive to inertial drifts and having efficient outputs at high frequency. It is however costly in terms of computing load due to the integration of N virtual platforms.

According to a second architecture dealt with in document EP1801539A (cf. FIG. 2), N filters in closed loop are used on a virtual platform. The advantages are the low cost in computing load due to the integration of a single virtual platform, whereas the drawbacks are the sensitivity to inertial drifts and the fact that the outputs are efficient at the frequency of the filters. As indicated in this document EP1801539 A, a detection of satellite fault must be implemented in order to select the Kalman filter the output of which (state vector) will be applied (as stabilisation vector) to the inertial measurements from the virtual platform to reset it.

Thus, this document provides for selecting the main Kalman filter when no fault of one of the satellites is detected, or, when a fault is detected, to select the secondary Kalman filter not affected by the fault. In so far as the corrections thus come from a single filter (the stabilisation vector of the inertial measurements thus being a recopy of the state vector estimated by the Kalman filter selected) and where this filter is not affected by a satellite fault, one does thus not apply to the inertial measurements erroneous corrections through propagation of information corrupted by a satellite fault.

However, these two types of architecture prove not to be entirely satisfactory in so far as they do not guarantee intrinsically that one of the filters of the bank will not be polluted by the fault. Indeed, if a fault is not detected or if the faulty satellite is excluded, the position calculated by the GNSS receiver is polluted by the fault. The correction models applied to the pseudo-measurements are then polluted, which causes a deterioration of all the corrected pseudo-measurements and thus the filter that does not use the pseudo-measurement where the fault is really present.

The objective of the invention is to make up for these drawbacks and proposes to this end, according to a first aspect, a hybridization device comprising a virtual platform calculating inertial measurements, a bank of Kalman filters each formulating a hybrid navigation solution on the basis of inertial measurements of the virtual platform and of measurements of signals emitted by a constellation of satellites delivered by a satellite positioning system, characterised in that it comprises, for each filter of the bank, a module for correcting the satellite measurements delivering to the filter the measurements of the satellite positioning system which are used by the filter after correction with the aid of the hybrid navigation solution formulated by the filter.

Certain preferred, but non limiting, aspects of this device are the following:
  the module for correcting satellite measurements receives at the input the hybrid navigation solutions formulated by the filters and the measurements corresponding to the set of the constellation delivered by the satellite positioning system;
  the measurements of the satellite positioning system which are used by a filter are pseudo-measurements;
  the device formulates a hybrid output corresponding to the inertial measurements calculated by the virtual platform corrected by a stabilisation vector;
  the stabilisation vector corresponds to a state vector estimated by a filter of the bank not affected by a satellite fault;
  each component of the stabilisation vector is formulated as a function of the corresponding components of the set of state vectors estimated by the filters of the bank;
  the device comprises a module for formulating the stabilisation vector configured, for each component of the stabilisation vector (dC[state]), so as:
  to analyse the sign of the set of corresponding components of state vectors;
  when the set of said corresponding components are not of same sign, to formulate a component of zero value for the stabilisation vector;

when the set of said corresponding components are of same sign, to formulate a component of non zero value for the stabilisation vector, determined as a function of the value of each of said components of state vectors.

the non zero value of the component of the stabilisation vector corresponds to the minimum of the set of corresponding components of state vectors when the set of said corresponding components are positive, and corresponds to the maximum of the set of corresponding components of state vectors when the set of said corresponding components are negative;

the non zero value of the component of the stabilisation vector corresponds to the average of smallest P corresponding components of state vectors, taken in absolute value;

the stabilisation vector is applied at the input of the set of filters of the bank of filters;

the hybrid output is re-looped at the input of the virtual platform;

the bank of Kalman filters comprises a main Kalman filter receiving the signal measurements emitted by n satellites corrected with the aid of the main hybrid navigation solution that it formulates, and n secondary Kalman filters each receiving the signal measurements emitted by the n satellites with the exception of a satellite corrected with the aid of the secondary hybrid navigation solution that it formulates.

According to a second aspect, the invention proposes an INS/GNSS hybridization method implementing a bank of Kalman filters each formulating a hybrid navigation solution on the basis of inertial measurements calculated by a virtual platform and of measurements of signals emitted by a constellation of satellites delivered by a satellite positioning system, characterised in that the satellite measurements used by each filter of the bank are corrected beforehand with the aid of the hybrid navigation solution formulated by the filter.

Other aspects, aims and advantages of the present invention will become clearer on reading the following detailed description of preferred embodiments thereof, given by way of non limiting example, and made in reference to the appended drawings in which FIG. 1 is a diagram illustrating a possible embodiment of a device according to the first aspect of the invention.

With reference to FIG. 1, a hybridization device 1 according to a possible embodiment of the first aspect of the invention is represented, intended to be fitted on board a carrier such as an aircraft. The hybridization device 1 uses information supplied by a UMI inertial measurement unit and by a GNSS satellite navigation system. The device 1 comprises a single virtual platform 2 and a bank 3 of Kalman filters in parallel.

The virtual platform 2 receives inertial increments from sensors (gyroscopes, accelerometers) of an inertial measurement unit. The inertial increments correspond in particular to angular increments and speed increments. Inertial navigation information (such as the orientation, the speed or the position of the carrier) is calculated by the virtual platform from these increments. Said inertial navigation information is designated PPVI inertial measurements hereafter.

Said PPVI inertial measurements are transmitted to a device for calculating pseudo-distances estimated a priori (not represented in FIG. 1) which also receives data on the position of the satellites. From on the one hand inertial measurements and on the other hand by data on the position of the satellites, the device for calculating pseudo-distances estimated a priori calculates the pseudo-distances a priori between the carrier and the different satellites visible from the carrier.

The hybridization device 1 also receives from the GNSS satellite navigation system the pseudo-measurements between the carrier and the different visible satellites. The deviations (known as observations) between the pseudo-measurements estimated a priori and the pseudo-measurements delivered by the GNSS system are then conventionally calculated.

The hybridization device 1 further comprises a bank of Kalman filters 3 realising the hybridization between the inertial information from the inertial unit and the information from the satellite navigation system. Apart from a function of supplying statistical information on the measurements at the output, the role of the filters is to maintain the virtual platform 2 in a linear domain of operation, an image of that modelled in the Kalman filter by each estimating a state vector dX0-dXn (comprising, as a general rule, of the order of 30 components).

In a manner conventionally known in itself, the bank of filters 3 comprises several Kalman filters in parallel. One of the filters is called main Kalman filter 8: it takes into account all of the observations (and to do this receives all of the measurements from the GNSS system) and formulates a main hybrid navigation solution.

The other filters $9i$, $9n$ are called secondary filters: they only take into account part of the observations, for example (n−1) observations among the n observations relative to the n visible satellites such that the i-th secondary Kalman filter $6i$ receives from the GNSS system the measurements from all of the satellites except from the i-th, and each formulates a secondary hybrid navigation solution.

It will be noticed that the process of formulating observations described above is not common to all of the filters of the bank 3, but is realised for each of the filters. Thus, the calculation of the pseudo-distances a priori and the calculation of the observations that are alluded to above are not common to all of the filters of the bank, but the hybridization device 1 according to the invention realizes these calculations for each filter of the bank.

In the same way, in FIG. 1 is represented a single module for correcting satellite measurements 4. It will however be understood that the hybridization device 1 according to the first aspect of the invention comprises a module for correcting satellite measurements 4 by filter of the bank.

Within the scope of the invention, it is thus provided advantageously to associate with each filter of the bank a module for correcting satellite measurements 4 delivering to the filter the measurements (typically the pseudo-measurements) of the satellite positioning system (GNSS) which are used by the filter after correction with the aid of the hybrid navigation solution formulated by the filter.

In order to formulate the hybrid navigation solutions, the device 1 comprises a bank of summers 10, where each summer is positioned at the output of the bank of filters to add to the state vector dX0-dXn formulated by a filter the hybrid output SH which will be presented in more detail hereafter.

It will be noticed that the reference navigation (hybrid output SH) formulated by the device 1 only serves internally. It is thus the information delivered at the output of the bank of summers 7 that supplies the optimal navigation solutions (main hybrid navigation solution "AV INS/GPS 0_ from the main Kalman filter, secondary hybrid navigation solution "AV INS/GPS i_ from the secondary Kalman filter of index i).

The module for correcting raw measurements 4 associated with a filter of the bank receives at the input the satellite measurements (typically the pseudo-measurements) used by the filter corresponding to all (main Kalman filter) or part (secondary Kalman filter) of the set of the constellation delivered by the GNSS satellite positioning system, and delivers at the output for each of the filters of the bank 3 said satellite measurements used by the filter after implementation of a model for correcting deterministic errors formulated from the hybrid navigation solution estimated by the filter.

The calculation of the observations is then realised on the basis of these satellite measurements corrected from information of the filter, and not from information of the GNSS system as is conventionally the case.

Conventionally the pseudo-measurements realised by a GNSS receiver are corrected within said same receiver. Indeed, the deterministic errors may be corrected to a large extent by using models that do not require positioning information to be calculated. It is proposed within the scope of the invention to realise this correction not in the receiver but for each filter of the bank, on the basis of the position estimated by the filter.

More precisely, the errors that affect the GNSS raw measurements are modelled. The modelling of atmospheric errors is dependent on the estimated navigation parameters. By adding (positively or negatively depending on the errors and the type of measurement) the value of the error calculated by model to the raw measurement, the error that is modelled is in part corrected. The error residue is then modelled statistically and characterised by a standard deviation calculated on the basis of navigation parameters.

Conventionally, the addition (positive or negative) of errors calculated by model to the raw measurements is realised by the GNSS receiver, so that the set of the bank of filters receives corrected measurements and the modelling of error residues. It follows on from this that the calculation of the error models and the standard deviations of the residues are then dependent on the position calculated by the GNSS receiver.

Taking the example of pseudo-distance measurements:

$$\text{Uncorrected\_PR} = \text{real\_distance} + \text{errors}$$

$$\text{Modelled\_errors} = f(\hat{X})$$

$$\text{Corrected\_PR} = \text{real\_distance} + \underbrace{\text{errors} - \text{modelled\_errors}}_{\sigma = h(\hat{X})}$$

The invention proposes moving this calculation of the error models and standard deviations of residues, as well as the application of models to the raw measurements in the module for correcting satellite measurements 4, and to realise the calculations for each filter on the basis of navigation parameters specific to each filter. In this way, the corrected measurements received by a filter are no longer dependent on the navigation parameters estimated by the GNSS receiver. Consequently, in the event of fault of a satellite, the corrected measurements received by the filter that does not use the faulty satellite are not affected.

Thus, the main Kalman filter receives from the module 4 the set of pseudo-measurements, corrected with the aid of the main navigation solution that it formulates. The secondary Kalman filter of index i 9i receives for its part from the module 4 the set of pseudo-measurements with the exception of that corresponding to the satellite of index i, corrected with the aid of the secondary navigation solution that it formulates.

In so far as the correction of the raw measurements is specific to each filter, the filter that does not use the pseudo-measurement polluted by the appearance of a fault is not affected by the fault (its navigation solution not polluted by the fault makes it possible in fact to correct the pseudo-measurements that it uses), and consequently it remains non polluted.

The hybridization device 1 according to the first aspect of the invention formulates a hybrid output SH corresponding to the PPVI inertial measurements calculated by the virtual platform 2 and corrected by a stabilisation vector dC.

According to a possible implementation of the invention, the corrections to apply to the inertial measurements are from a single Kalman filter. Thus, the stabilisation vector is equal to the correction vector estimated by the Kalman filter selected. The selection takes place for example according to the document EP1801539 A by detection of any satellite fault.

According to another advantageous implementation of the invention, the stabilisation vector is formulated component by component, using for each component the set of vectors of states estimated by the Kalman filters.

The device 1 according to the invention comprises to this end a module for formulating the correction 5 configured to formulate each of the components dC[state] of the stabilisation vector dC as a function of the set of corresponding components dX0[state]-dXn[state] of the correction vectors dX0-dXn.

According to a possible embodiment of the invention, the module for formulating the correction 5 is configured, for each component dC[state] of the stabilisation vector dC, so as:

to analyse the sign of the set of corresponding components dX0[state]-dXn[state] of the correction vectors estimated by the Kalman filters; and when the set of said corresponding components are not of same sign, to formulate a component of zero value (dC[state]=0) for the stabilisation vector;

when the set of said components dX0[state]-dXn[state] are of same sign, to formulate a component of non zero value for the stabilisation vector, determined as a function of the value of each of said components dX0[state]-dXn[state].

The module for formulating the correction 5 is for example configured so that the non zero value of the component of the stabilisation vector dC[state] corresponds to the minimum of the set of corresponding components dX0[state]-dXn[state] of the correction vectors when said components dX0[state]-dXn[state] are all positive, and corresponds to the maximum of the set of components dX0[state]-dXn[state] of the correction vectors when said components dX0[state]-dXn[state] are all negative.

In a variant, the module for formulating the correction 5 may be configured so that the non zero value of the component of the stabilisation vector dC[state] corresponds to the average of smallest P (P being for example equal to 2) corresponding components dX0[state]-dXn[state] of the correction vectors, taken in absolute value.

The stabilisation vector formulated according to this possible embodiment of the invention makes it possible to minimise the errors estimated for all of the filters.

This elaboration of the stabilisation vector proves judicious in so far as it is not constrained by a mechanism of detection and exclusion of faults (FDE or Fault Detection and Exclusion mechanism) and where the validity of the protection rays is not constrained by a FDE. Within the scope of this variant, the virtual platform and the bank of filters will be polluted by a satellite fault, but not the filter which excludes the faulty satellite.

The stabilisation vector dC thus formulated by the module 5 or simply selected among the state vectors of the filters makes it possible to correct, with a delay 6, the PPVI inertial measurements calculated by the virtual platform, by using in a manner conventionally known in itself a subtractor V.

Within the scope of a hybridization device in closed loop, the hybrid output SH is re-looped at the input of the virtual platform.

Moreover, as is represented in FIG. 1, the stabilisation vector dC may be applied at the input of the set of filters of the bank of filters. In such a way, the Kalman filters are adjusted by subtracting from their estimation (correction vector dX) the correction dC, and are thus maintained coherent with the virtual platform.

The architecture proposed by the invention has the following advantages:
- it only requires the integration of a single virtual platform;
- the Kalman filter that does not use the faulty satellite is not polluted by the fault;
- the filters of the bank are totally segregated;
- the calculation of the stabilisation command of the platform is not constrained by a fault protection method.

The invention is not moreover limited to a hybridization device according to its first aspect, but also extends to an INS/GNSS hybridization method implementing a bank of Kalman filters each formulating a hybrid navigation solution on the basis of inertial measurements calculated by a virtual platform and signal measurements emitted by a constellation of satellites delivered by a satellite positioning system, characterised in that the satellite measurements used by each filter of the bank are corrected beforehand with the aid of the hybrid navigation solution formulated by the filter.

The invention claimed is:

1. Hybridization device (1) comprising
   a virtual platform calculating inertial measurements, a bank of Kalman filters each formulating a hybrid navigation solution on the basis of inertial measurements of the virtual platform and of measurements of signals emitted by a constellation of satellites delivered by a satellite positioning system for each filter of the bank, a module for correcting the satellite measurements,
   which receives at the input the hybrid navigation solutions formulated by the filters and the measurements corresponding to the set of the constellation delivered by the satellite positioning system
   delivers to the filter the measurements of the satellite positioning system which are used by the filter alter correction with the aid of the hybrid navigation solution formulated by the filter.

2. Device according to claim 1, wherein the measurements of the satellite positioning system which are used by a filter are pseudo-measurements.

3. Device according to one of claims 1, formulating a hybrid output corresponding to the inertial measurements calculated by the virtual platform and corrected by a stabilization vector.

4. Device according to claim 3, wherein the stabilisation vector corresponds to a state vector estimated by a filter of the bank not affected by a satellite fault.

5. Device according to claim 3, wherein each component of the stabilization vector is formulated as a function of the corresponding components of the set of state vectors estimated by the filters of the bank.

6. Device according to claim 5, comprising
   a module for formulating the stabilisation vector configured, for each component of the stabilisation vector, so as
   to analyse the sign of the set of corresponding components of the state vectors
   when the set of said corresponding components are not of same sign, to formulate a component of zero value for the stabilisation vector;
   when the set of said corresponding components are of same sign, to formulate a component of non zero value for the stabilisation vector, determined as a function of the value of each of said components of state vectors.

7. Device according to claim 6, wherein the non zero value of the component of the stabilisation vector corresponds to the minimum of the set of corresponding components of the state vectors when the set of said corresponding components are positive, and corresponds to the maximum of the set of corresponding components of the state vectors when the set of said corresponding components are negative.

8. Device according to claim 6, wherein the non zero value of the component of the stabilisation vector corresponds to the average of smallest P corresponding components of state vectors, taken in absolute value.

9. Device according to claim 1, wherein the stabilisation vector is applied at the input of the set of filters of the bank of filters.

10. Device according claim 1, wherein the hybrid output is re-looped at the input of the virtual platform.

11. Device according to claim 1, wherein
    the bank of Kalman filters comprises a main Kalman filter receiving the measurements of signals emitted by n satellites corrected by the main hybrid navigation solution that it formulates, and n secondary Kalman filters each receiving the signal measurements emitted by the n satellites with the exception of one satellite corrected with the aid of the secondary hybrid navigation solution that it formulates.

12. Hybridization method implementing a bank of Kalman filters each formulating a hybrid navigation solution on the basis of inertial measurements calculated by a virtual platform and of measurements of signals emitted by a constellation of satellites delivered by a satellite positioning system, wherein for each filter of the bank, a module for correcting the satellite measurements, which
    receives at the input the hybrid navigation solutions formulated by the filters and the measurements corresponding to the set of the constellation delivered by the satellite positioning system
    delivers to the filter the measurements of the satellite positioning system which are used by the filter after correction with the aid of the hybrid navigation solution formulated by the filter
    the satellite used by each filter of the bank are corrected beforehand with the aid of the hybrid navigation solution formulated by the filter.

* * * * *

UNITED STATES PATENT AND TRADEMARK OFFICE
CERTIFICATE OF CORRECTION

PATENT NO. : 8,625,696 B2  
APPLICATION NO. : 13/139720  
DATED : January 7, 2014  
INVENTOR(S) : Sebastien Vourc'h and Victor Mauger Page 1 of 1

It is certified that error appears in the above-identified patent and that said Letters Patent is hereby corrected as shown below:

In the Specification

Column 7, line 5, please delete "subtractor V" and insert --subtractor 7--.

Signed and Sealed this
Second Day of September, 2014

Michelle K. Lee
*Deputy Director of the United States Patent and Trademark Office*